United States Patent [19]

Rehse et al.

[11] Patent Number: 5,381,190
[45] Date of Patent: Jan. 10, 1995

[54] LOW VISION LENS ASSEMBLY WITH ADHESIVE COUPLING RING

[75] Inventors: Denis Rehse, St. Petersburgh; Frank Rumsey; Tim Petito, both of Pinellas Park; Samuel Garrett, Tampa; Giovanna Olivares, Pinellas Park; David Welsh; Roger Antici, both of Largo; Josepha Bruno, St. Petersburgh, all of Fla.

[73] Assignee: Unilens Corp, U.S.A., Largo, Fla.

[21] Appl. No.: 990,847

[22] Filed: Dec. 11, 1992

[51] Int. Cl.⁶ .................. G02B 7/02; G02C 9/00
[52] U.S. Cl. ................... 351/57; 351/172; 351/178; 359/819; 359/827; 428/40
[58] Field of Search .......... 359/440, 441, 816, 819, 359/827, 830; 427/208, 208.4, 208.6; 428/40, 41, 42; 351/41, 57, 61, 140, 154, 155, 158, 159, 172, 178, 231

[56] References Cited

U.S. PATENT DOCUMENTS

| | | | |
|---|---|---|---|
| 3,522,983 | 8/1970 | Daniels | 359/827 X |
| 3,628,854 | 12/1971 | Jampolsky | 351/57 X |
| 4,298,254 | 11/1981 | Reddick | 351/50 |
| 4,645,317 | 2/1987 | Frieder et al. | 351/172 |
| 4,679,918 | 7/1987 | Ace | 351/163 |
| 4,834,525 | 5/1989 | Vansaghi | 351/57 X |
| 4,846,913 | 7/1989 | Frieder et al. | 351/172 |
| 4,859,261 | 8/1989 | Ace | 351/172 |

*Primary Examiner*—Anita Pellman Gross
*Assistant Examiner*—David R. Parsons
*Attorney, Agent, or Firm*—Yahwak & Associates

[57] ABSTRACT

A low vision lens for attachment to the front surface of an ophthalmic lens by an adhesive ring coupling carried by the lens, a method for making such a lens assembly, and a method for attaching such lens to the front surface of ophthalmic lens is described.

13 Claims, 2 Drawing Sheets

LOW VISION LENS ASSEMBLY WITH ADHESIVE COUPLING RING

At least 3 million Americans suffer severe visual impairment with an annual incidence of about 280,000 new low level vision cases being diagnosed each year. In a 1984 study by the National Center for Health Statistics, more than 8% of those patients over 65 years of age had near visual impairment and could not read standard newsprint; this is expected to increase 20% in the next decade.

The term "low vision" as used herein is defined as having significant visual impairment, but also includes having significant usable vision. Implied in this definition is a decreased performance level either by the patient's customary standards or by the standards dictated by an employer or governmental agency. Therefore, low vision cannot be judged only by visual criteria, but must also include the person's reaction to the condition and demands of the visual tasks the person needs to perform. As an example of this, a 20/70 level of vision is not a significant impairment to mobility, including driving an automobile, but it is a significant reading impairment; a 15 degree field of vision may not prevent reading, but it would be considered to be a severe difficulty to mobility.

A majority of low vision or visually impaired patients are patients who have suffered some retinal or optic nerve damage which results in decreased visual function due to (1) decreased visual acuity, (2) decreased visual field, (3) formation of scotomas (blind spots) primarily in the macular region, and (4) a combination of the above.

The physiological architecture of tile central part of the retina (the macula) is such that it provides the eye the ability to resolve fine detail. The physiological architecture of the retinal elements that are not close to the macula do riot have the capability of resolving fine detail. Currently, the leading cause of blindness in the United States is a condition called "age related macular degeneration" or ARMD. In this condition, abnormal blood vessels (neovascular vessels) grow in the central part of the retina. These vessels may leak blood quite readily and therefore be the cause of macular scarring. When the macula is damaged by scarring, the eye loses its ability to resolve fine detail and acquires a central scotoma. Although the macula is damaged in this disease, the rest of the retina is healthy. Although ARMD may be minimally disabling in the dry state, it is a potential risk factor for severe visual loss, and may change at any point in time. More than 10 million Americans over the age of 50 suffer from ARMD.

To enhance the visual function of a patient who has ARMD, the "good" or healthy retina needs to be utilized. However, the resolution of this part of the retina is not good. Therefore, there is a need for a low vision lens which provide high magnification in order to maximize visual function in these patients.

Another group of low vision or visually impaired patients are patients who have suffered cataract. While the effects of cataracts are dependent on the type and severity of the cataract, they are also dependent on various environmental conditions, i.e. lighting, glare; they are also dependent upon the tasks the patient is involved with, i.e. color vision discrimination of paint inspectors, welders and artists. Approximately 75% of people over 65 will develop cataracts, with about 3.5 million Americans now being affected.

Still another group of low vision or visually impaired patients are patients with diabetic retinopathy. Approximately 3.1 million Americans over the age of 65 have diabetes, and nearly 60% of those with the disease for more than 15 years will have diabetic retinopathy.

Still other groups of low vision or visually impaired patients are those between the ages of 20 and 64; an estimated 20% of these are impaired because of pathologies such as albinism, retinal dystrophies, trauma, brain injuries, etc.

In each of these groups of vis,Jally impaired patients, the support and expertise of low vision providers and professionals, using the low vision lens described herein, may be helpful to provide the patient with a means around the impairment.

Optically, these patients are many times provided with hand held magnifiers or stand mounted magnifiers which are plus (+) lenses placed between the material and the patient's eye; microscopes which consist of a high powered (+) lens or lens system which allows the patient to benefit from the magnification gained by holding the material at a very close working distance; or telescope lens systems which resemble one-half of a pair of binoculars and which may be hand held or mounted in the lens of a pair of glasses. However, each of these systems to correct low vision impairment has problems in usage.

Optically, as magnification increases the field of view will decrease. In addition, optical aberrations such as spherical aberration and coma can decrease the field of view as well as decrease image resolution.

Accordingly, it is one aspect of the present invention to provide for a spectacle mounted low vision lens which overcomes many of the problems presently found associated with such lenses while providing for an efficient maximization of the patient's remaining visual function.

As the low vision lens according to the present invention is a spherically corrected convex meniscus which is mounted on the patient's pair of glasses by the eye care professional creating a microscopic system, an additional aspect of the present invention is to provide a low vision spectacle wherein the selection of frame and the material of the ophthalmic lens for the distance correction (the patient's normal glasses) is not limited by the lens, but is limited by the industry wide availability of lens material and frame design. This is not possible with current low vision lens corrections which are placed within the ophthalmic lens of the patient's glasses.

Other aspects and advantages of the present invention include providing for positioning flexibility (including eccentric positioning) of the lens with the patient able to provide instant feedback on the position and evaluation on the correct prescription at the time of fitting, a finished low vision lens wherein weight is negligible as compared to other corrective lenses presently available, and wherein cosmetic magnification effects are reduced.

These and other aspects of the present invention, and a more thorough and complete understanding of the present invention will become apparent from the following detailed description of taken in conjunction with the accompanying figures. In the figures, FIG. 1 is a front plan view of the adhesive coupling ring which makes up one portion of the low vision lens assembly according to the present invention;

Figure 1:
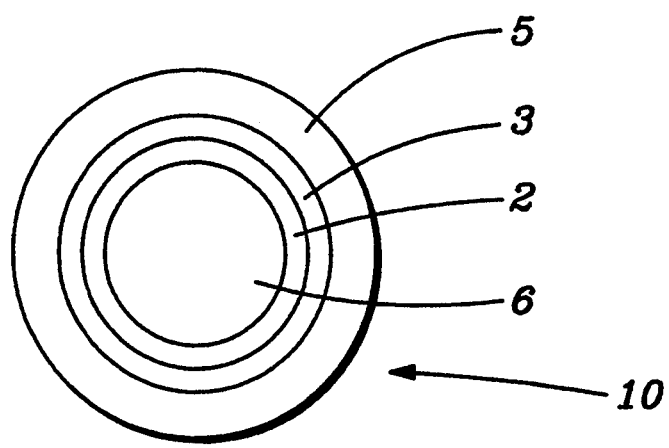

With specific reference to the figures, there is shown a front plan view of an adhesive coupling ring 10 by which a low vision lens 30 according to the present invention may be attached to an ophthalmic lens 41 in a patient's pair of eye glasses 40. More particularly, the coupling ring shown in FIG. 1 (FIG. 1 is taken as a front plan view of the structure depicted in FIG. 2 taken along lines 1—1, that is a front plan view of the adhesive coupling ring without concentric ring 1) consists of a series of individual concentric rings which, when assembled, will have a central opening 6 along the central axis 33 of the coupling ring 10. Generally, the coupling ring 10 will have a front side 21 which will hold the low vision lens 30 according to the present invention, and a rear side 20 by which the lens 30 will be attached to the patient's ophthalmic glass lens 41.

Concentric ring 1 (FIG. 2) is a non-stick protective liner for adhesive ring 2, ring 3 is a non-stick protective liner positioned between adhesive rings 2 and 4, and ring 5 is a non-stick protective liner for adhesive ring 4. It is preferred that the outer diameter of ring 2 be equal or substantially equal to the outer diameter of the aspherical surface 32 of lens 30. It is a so preferred that adhesive ring 4 have a low-tack adhesive on the rear side of the ring in order that the lens carried by the coupling ring may be optimally positioned on the ophthalmic lens 41 of the patient's glasses 40 prior to being permanently fixed in position. Such low tack adhesives are well known in the adhesive art, and one such adhesive which may be used is MMM product No. 9415.

Figure 2:
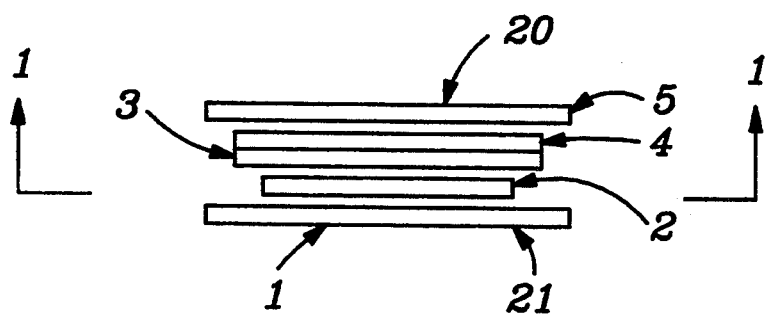
FIG. 2 is a side plan exploded view of the adhesive coupling ring depicted in FIG. 1.
Figure 3:
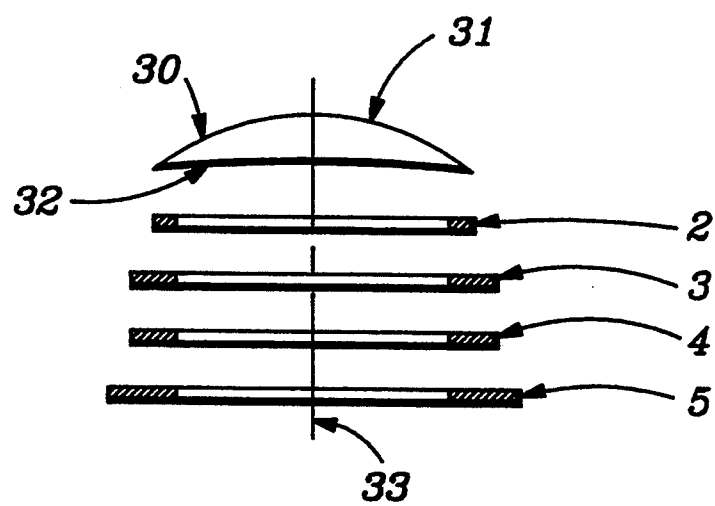
FIG. 3 is a cross sectional exploded view of the low vision lens assembly according to the present invention.
Figure 4:
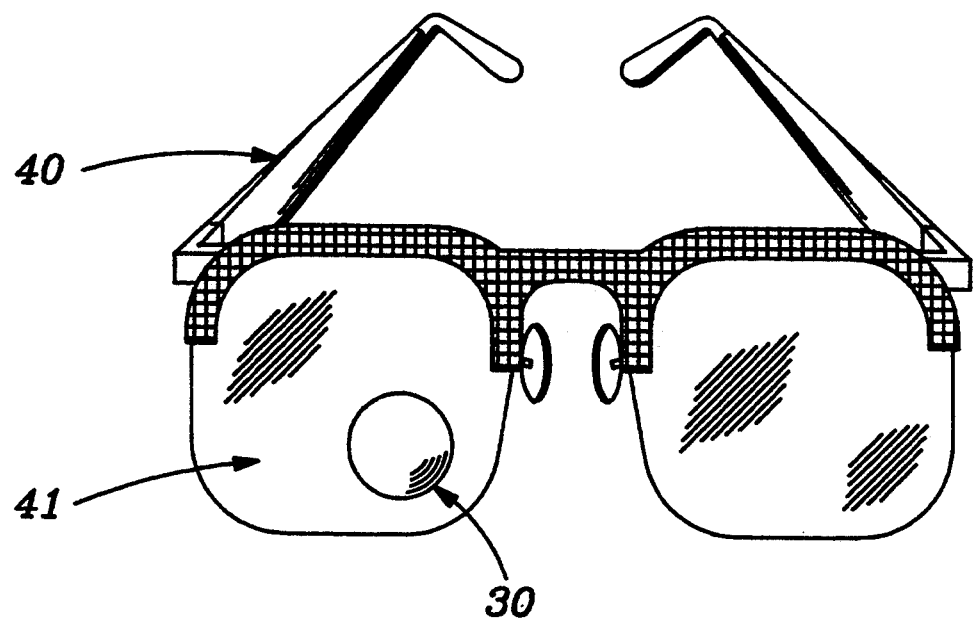
FIG. 4 is a front plan view of eye glasses with the low vision lens according to the present invention attached to the distal surface of the ophthalmic lens.
Figure 5:
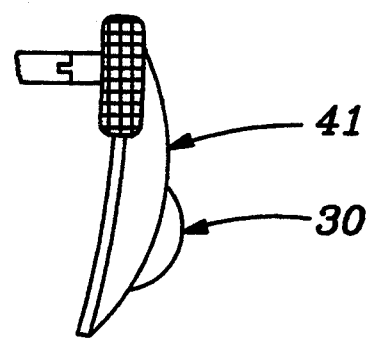
FIG. 5 is a side view showing the low vision lens according to the present invention attached to the ophthalmic lens.

The low vision lens according to the present invention may be provided to the eye care professional as either a two-piece kit containing a lens 30 and a coupling ring 10 as shown in FIGS. 1 and 2, or as a pre-assembled lens (FIG. 3) wherein the lens would be directly attached to the front side of adhesive ring 2. It is preferred that the rear side of adhesive ring 2, that is the side of the ring which will adhere the lens to the ophthalmic spectacle lens, be of a composition which will allow the: lens to be removed from the spectacle lens with a solvent. Such adhesive preparations are well known in the adhesive art and include, for example, MMM product No. 9500. In addition it is preferred that the aspheric surface 32 of the low vision lens 30 have the same curvature of the ophthalmic lens 41 in order to provide a minimum of visual aberration to the patient.

If provided in a kit, the lens 30 will first be attached to adhesive coupling ring 2 by removing the non-stick protective liner 1 and centering the lens on the adhesive ring 2. More specifically, the eye care professional will first need to remove liner 1 from adhesive ring 2 to expose the adhesive carried on the ring. After removal, and either using an instrument adapted for the purpose of aligning the adhesive ring with the lens or by doing such alignment by "sight", the provider will then place lens 30 so that the back, aspheric surface 32 of lens 30, will come in contact with the adhesive on ring 2. It is preferable that the lens be handled with a small suction cup, such as those provided contact lens patients for handling contact lenses, or similar device to avoid oil from the eye care professional's hands from becoming attached to the lens and to make alignment easier by providing a "holder" for the lens, by attaching the cup to the spherical surface 31 of the low vision lens. Once aligned, the lens can then be adhered to the coupling ring by finger pressure or other methods of adhering the two pieces together.

The placement and optimal positioning of the low vision lens by the eye care professional follows a two-step approach. The first of these is the temporary positioning of the low vision lens onto the ophthalmic lens. Such a procedure may be as follows:

The lens 30 with the coupling ring 10 attached is first placed on a flat surface, and a small moistened suction cup is attached to the spheric surface of the lens; the protective liner 5 is removed from the coupling ring, and the lens is placed on the front, distal surface of the patient's ophthalmic spectacle lens 41 in approximately the position desired; and once positioned and held in place on the lens by the low tack adhesive carried on ring 4, the suction cup instrument is removed. The patient will then be asked to read a piece of printed material with the lens in place to evaluate the initial placement (both horizontal and vertical positioning should be confirmed) of the lens on the ophthalmic lens in the patient's eye glasses. If the lens needs to be adjusted, the suction cup may be used to reposition the lens, and the position re-verified by the patient. Once the correct placement of the lens is determined, on the ocular or proximal side of the ophthalmic lens, the eye care provider may then mark the position of the low vision lens with any type of marker that can be readily removed without leaving permanent marks.

After the correct placement of the low vision lens is determined, the lens is removed and the spectacle lens' surface is cleaned with mild soap and water or any other lens cleaning solutions to remove traces of materials which may affect final adhesion of the low vision lens. The protective liner 3 is then removed from the coupling ring, exposing the "permanent" (but being able to be dissolved with solvent treatment) adhesive on the rear facing of adhesive ring 2. Holding the eye glass frame horizontal, the low vision lens is centered in place using the marks placed on the ocular face of the ophthalmic lenses, and once the lens is in its desired position, the lens assembly is pressed against the ophthalmic lens adhering the low vision lens to the spectacle lens.

The low vision lens according to the present invention is a round, high (+) convex lens which, when mounted on a spectacle lens will form a microscopic system. The lens itself is manufactured preferably from a polymeric material such as PMMA, that is, polymethylmethacrylate, although other equivalent materials, well within the knowledge of the lens making art, having the magnification characteristics may be conventionally used. Unlike spherical lenses presently available for correction of low vision impairment and in which image quality can suffer from the effects of spherical aberration, the low vision lens according to our invention preferable incorporates an aspheric front power curve, spherically corrected, which will improve image quality by virtually eliminating spherical aberration. Optically, the spherically corrected low vision lens according to our invention will provide better edge to edge clarity when compared to a sphere of the same power. This will also allow for a significant improvement in providing a larger field of view for the patient. The back, aspheric curve 32 of the lens, is produced to match the front curve of ordinary glasses. The mounting system designed to mount the low vision lens on a patient's spectacle glasses will also allow the eye care professional to mount the lens with ease in an office setting, and while the patient is still in the office, the eye care professional will have the ability to determine the exact power needed in the lens as well as the patient's preferred location for mounting the lens. If changes in either the positioning of the lens or prescription of the lens are needed, the low vision lens according to our invention may be removed, replaced with a lens of a different prescription, or it may be re-applied at a different location on the spectacle.

Although by no means should the present invention be limited to the specific embodiments described herein, acceptable low vision lens according to the present invention may have, for example, an outer diameter of 22.25 ram, a base radius of 67.00, edge thickness of 0.5 ram, and powers (front vertex) of +8.00 diopters to +24.00 diopters in +4.00 diopter steps. Of course, low vision lenses according to the present invention with different diameters, base radii, edge thicknesses, and higher (or lower) powers may also be prepared and are encompassed by the present invention.

Thus, while we have illustrated and described the preferred embodiment of our invention, it is to be understood that this invention is capable of variation and modification, and we therefore do not wish or intend to be limited to the precise terms set forth, but desire and intend to avail ourselves of such changes and modifications which may be made for adapting the present invention to various usages and conditions. For example, under certain conditions and needs, the preferred lens having a front aspheric power curve as described above may be replaced with a totally spheric lens (front and back aspheric curves, "bispheric"). Accordingly, such changes and modifications are properly intended to be within the full range of equivalents, and therefore within the purview of the following claims. The; terms and expressions which have been employed in the foregoing specification are used therein as terms of description and not of limitation, and thus there is no intention, in the use of such terms and expressions, of excluding equivalents of the features shown and described, or portions thereof, it being recognized that the scope of the invention is defined and limited only by the claims which follow.

Having thus described our invention and the manner an process of making and using it in such full, clear, concise, and exact terms so as to enable any person skilled in the art to which it pertains, or to with which it is most nearly connected, to make and use the same, We claim:

1. A low vision lens having an aspheric front surface and a rear surface, and wherein the rear surface has attached thereto a coupling ring assembly comprising a first adhesive ring to which the rear surface of the lens is attached, and rearwardly therefrom, a protective removable non-adhesive liner, a second adhesive ring, and a second protective removable non-adhesive liner.

2. A lens according to claim 1 wherein the rear surface of the lens has a curvature.

3. A lens according to claim 2 wherein the curvature is aspheric.

4. A lens according to claim 2 wherein the curvature is the same as the front surface of an ophthalmic lens to which it is intended to be attached.

5. A lens according to claim 1 wherein the outer diameter of the first adhesive ring is substantially equal to the diameter of the rear surface to which it is attached.

6. A lens according to claim 1 wherein the second adhesive ring has a low-tack adhesive on the rearwardmost side of the ring.

7. A lens according to claim 1 which is a spherically corrected convex meniscus lens.

8. A lens according to claim 7 which is a positive power convex lens.

9. A lens according to claim 8 which has been manufactured to have a front vertex power of from about +8.00 diopter to about +24.00 diopter.

10. A lens according to claim 1 which has a spherically-corrected aspheric front power curve and an aspheric back surface of the same curvature as the front surface of an ophthalmic lens to which it is intended to be attached.

11. A lens according to claim 1 which is polymeric.

12. The lens according to claim 1 which is polymethylmethacrylate.

13. A method for manufacturing a low vision lens which comprises:
   attaching a low vision lens having a rear surface to an adhesive coupling ring comprising a first adhesive ring to which the rear surface of the lens is attached, and rearwardly therefrom, a first removable non-adhesive liner, a second low-tack adhesive ring, and a second removable non-adhesive liner;
   removing the second non-adhesive liner from the coupling ring;
   aligning the low vision lens onto an ophthalmic lens for best placement for the user and adhering the low vision lens to the ophthalmic lens in the aligned position;
   marking the reverse side of the ophthalmic lens indicating the aligned position and removing the low vision lens from the ophthalmic lens;
   removing the first removable non-adhesive liner from the coupling ring; and
   adhering the low vision lens to the ophthalmic lens.

* * * * *